Dec. 29, 1959     K. H. BUTLER ET AL     2,919,365
HIGH PRESSURE MERCURY VAPOR LAMP
Filed March 2, 1956
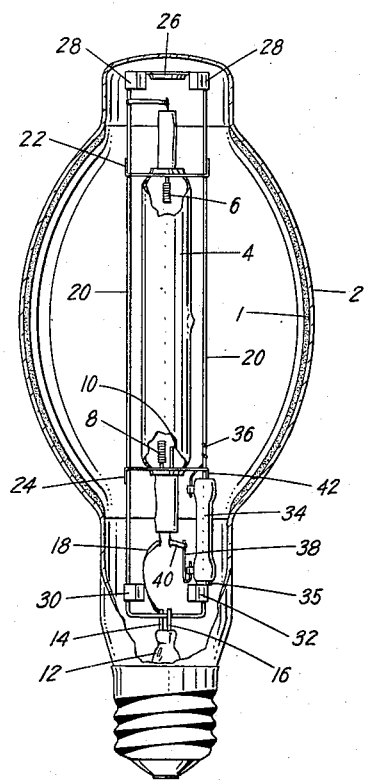
INVENTORS;
KEITH H. BUTLER
MARTHA J. THOMAS
BY Lawrence Burns
ATTORNEY

United States Patent Office 2,919,365
Patented Dec. 29, 1959

2,919,365
HIGH PRESSURE MERCURY VAPOR LAMP

Keith H. Butler, Marblehead, and Martha J. Thomas, Brookline, Mass., assignors, by mesne assignments, to Sylvania Electric Products Inc., Wilmington, Del., a corporation of Delaware Application March 2, 1956, Serial No. 569,054

2 Claims. (Cl. 313—108)

This invention relates to fluorescent electric discharge lamps and to phosphors for use in such lamps. In some aspects, the invention relates to combinations of such lamps with phosphors especially suited therefor, and in particular to the combination of a high pressure mercury lamp with certain alkaline earth orthophosphate phosphors.

The discharge in such high pressure mercury lamps emits violet, blue, green and yellow light, but is deficient in red. Accordingly, the lamp gives an abnormal color to many objects, and particularly to the human complexion. The emission, however, also contains a considerable amount of ultraviolet radiation, and various attempts have been made to associate a red-emitting phosphor with the lamp so that it can be excited by said radiation. The phosphor is placed on the inner surface of a transparent outer jacket which surrounds the discharge tube.

The temperature of the outer jacket in such a lamp is less than that of the discharge tube itself, but is still quite high, ranging from 150° C. to 350° C. in most commercial lamps. The phosphor used must have good fluorescence and chemical stability at those temperatures, and must respond efficiently to the kind of ultraviolet radiation emitted from such lamps. The ultraviolet radiation from a high-pressure mercury discharge tube is mostly in the range between 300 and 380 millimicrons, and particularly in the 313 and 366 millimicron mercury wavelengths.

These several requirements have heretofore limited the useful phosphors to two materials, namely magnesium arsenate and magnesium fluogermanate, each being activated by tetravalent manganese. Both of these phosphors have very sharply peaked emission bands, centering at about 650 millimicrons. When used as a coating on the outer envelope of the high pressure mercury vapor lamp they do give excellent color renditions of red objects but the rendition of blues, blue greens and of various other colors is still very poor. Also the visual effectiveness of the red light is so low that the lumen output of the phosphor is lower than the loss by absorption of visible light from the mercury arc and as a result the phosphor coated lamps give fewer lumens per watt than uncoated lamps. In other words, the gain in red light is obtained at the sacrifice of lamp efficiency.

We have discovered that certain tin-activated strontium-zinc ortho-phosphate phosphors can be used in such high pressure mercury lamps to supply red light without any sacrifice of lamp efficiency, and in fact with an actual gain in efficiency. This gain is due to the broad spectrum of the visible emission from the phosphor, which not only corrects the red deficiency, but also supplements the light from the discharge throughout the visible spectrum. These new phosphors can be described by the chemical formula.

$a\text{SrO} \cdot b\text{ZnO} \cdot \text{P}_2\text{O}_5 \cdot x\text{SnO}$

For such use, the value of $b$ can be between 0.1 and 0.3 for good results, and the value of $a+b$ can be between about 2.75 and about 2.90. The value of $x$ can be between 0.04 and 0.12. The foregoing ranges are best in phosphors for use in high pressure mercury lamps, but the range for good results is much broader if the phosphor is used in a low-pressure mercury fluorescent lamp.

The above examples are merely illustrative and must not be taken as limiting the scope of our invention. However, in one example of the invention, the outer envelope of a 100-watt H.P.M.V. lamp was coated with a phosphor whose composition was 2.65 SrO, 0.20 ZnO, 0.08 SnO, and 1.0 $\text{P}_2\text{O}_5$. The emission spectrum of the phosphor covered most of the visible spectrum with a very broad peak at about 600 millimicrons. The light output was about 40 lumens per watt, while an uncoated lamp was found to give 33 lumens per watt. Color rendition was greatly improved for a wide range of materials of varying color and the human complexion had a quite satisfactory appearance.

In another example, the outer envelope of a 400-watt H.P.M.V. lamp was coated with the same phosphor used in Example 1. The finished lamp was found to give about 23,000 lumens while a similar lamp made with magnesium fluogermanate phosphor gave only 19,500 lumens. The lamp without any phosphor coating gave 21,000.

We have found that the amount of light emitted by the phosphor is dependent on the temperature of the outer envelope at which the phosphor coating is applied and that this light can be increased somewhat by increasing the size of this envelope so that the temperature attained corresponds to the optimum operating temperature of the phosphor. We have also found that to obtain the maximum light from the phosphor it is sometimes desirable to change the pressure at which the arc tube operates to a value different from that giving the maximum amount of visible light.

These fluorescent high pressure mercury vapor lamps are particularly suited to lighting buildings where the lights must be suspended at a considerable height above the floor and where the work requires reasonably good color rendition. They are also well suited for street lighting where they will improve visibility for drivers because of the more normal color appearance of objects in the street. The good color rendition also makes it possible to use these improved mercury lamps for show window lighting in stores to provide a high intensity of general illumination.

While we have indicated in the examples above a certain preferred phosphor composition this is intended only as an example and other phosphors giving a broad energy distribution of emitted light, with the light from the phosphor constituting a substantial portion of the total light, and have good emission efficiency at high temperatures may also be used.

Other useful phosphors can be selected from the compositions described hereinafter, some of which are especially suitable for use in high-pressure mercury lamps, and others for use with other sources, such as the low pressure mercury lamp, which is rich in 254 millimicron radiation and deficient in the 300 to 380 millimicron radiation.

When the phosphor is used in a low-pressure mercury vapor fluorescent lamp, the phosphor range for good efficiency will be much broader than the range for use in mercury lamps, for which use the tin content is especially critical.

Strontium-zinc phosphate has been previously known as a phosphor, but we have made the discovery that over a particular range of ingredients a strontium-zinc phosphate phosphor, tin-activated, can be used at high temperatures as a phosphor in mercury lamps.

Strontium orthophosphate without the zinc has only an ultraviolet emission, but when used with amounts of zinc between 0.1 and 0.3 gram-atom per mole of equivalent phosphorous pentoxide, gives an orange emission.

Several equivalent chemical formulas may be used to describe our zinc modified strontium orthophosphate phosphors. The first formula is $$a\text{SrO}.b\text{ZnO}.x\text{SnO}.\text{P}_2\text{O}_5$$

Certain features of the method of preparation of these phosphors are not dependent on the relative proportions of strontium and zinc. These features can be described in terms of the formula $$m\text{MO}.\text{P}_2\text{O}_5.x\text{SnO}$$

First, the number of moles of strontium oxide plus zinc oxide plus tin oxide, given by $m+x$ must be less than about 2.98 and must be greater than 2.50. Second, the number of moles of tin oxide, given by $x$, must be between about 0.002 and 0.16. Third, the method of preparation must be such that at least part of the tin is in the stannous, or divalent, state in the finished phosphor. Actually, all of the tin can be in the stannous state with excellent results, although it is not actually necessary that it all be in that state, especially when the amount of tin present is large, say 0.12 gram-atoms per gram-mole of the phosphate radical. However, when the phosphor is to be used in a high pressure mercury lamp, it is best to have substantially all of the tin, or at least the major portion of it, in the stannous state.

In the manufacture of these tin activated phosphors, suitable raw materials are mixed in proportions to give the desired phosphor composition and the mixture is then fired to give the finished phosphor. It is necessary to perform this firing in such a way as to give the amount of stannous tin needed for activation of the finished phosphor.

Our preferred method of firing is to fire first the mixture of selected raw materials, including the tin compound, at a temperature suitable for forming the orthophosphate compound which is the phosphor matrix. This firing gives a white non-fluorescent powder. After this prefiring the material is mixed thoroughly and then refired in a reducing atmosphere which converts the tin to the stannous state and gives a fluorescent material. The preferred reducing atmosphere is a mixture of hydrogen with nitrogen. There are various modifications of this preferred method of firing which will attain the desired results of forming a strontium-zinc orthophosphate containing stannous tin in solid solution which will be readily apparent to those skilled in the art. For example, the raw materials can include stannous oxide and be fired in a slightly reducing atmosphere directly, without being first fired in air, in which case substantially all of the tin will be in the stannous state.

For raw materials we prefer to use strontium hydrogen phosphate, strontium carbonate, zinc oxide and stannic oxide since these are easily obtainable in a high state of purity. Alternative materials include zinc phosphate, zinc carbonate, stannous oxide, stannous chloride, ammonium phosphate and other equivalent sources of strontium, zinc, tin and phosphate. Suitable proportions of these raw materials can be mixed by dry blending, by ball milling in an inert volatile solvent or by other well known methods. We also frequently use a small amount of ammonium chloride to promote the uniform distribution of tin throughout the phosphor but its use is not essential to the preparation.

Measurements of the emission spectrum of strontium orthophosphate activated by stannous tin have shown the emission to be a broad band extending from about 300 millimicrons in the ultraviolet to about 450 millimicrons in the blue, with the peak falling at 370 millimicrons. Since the emission is predominantly in the ultraviolet the visible fluorescence is a weak blue. When zinc is used as a partial replacement for strontium to give a phosphor having the composition $$2.65\text{SrO}.0.20\text{ZnO}.\text{P}_2\text{O}_5.0.025\text{SnO}$$

the emission spectrum is radically changed. With excitation by 313 millimicron radiation the emission color is a brilliant orange and measurements show an emission band peaking at 600 millimicrons and extending from 470 millimicrons into the very deep red at 750 millimicrons. With excitation by 254 millimicron radiation the emission color is an orange white. Measurements show two emission bands are present, the first of these is the same as that found with 313 excitation, while the second band, which is considerably weaker, peaks at 390 millimicrons and extends from 340 to 470 millimicrons.

Similar emission characteristics are found for other strontium-zinc orthophosphate phosphors with zinc contents between 0.10 ZnO and 0.35 ZnO with some variations in the relative intensities of the two bands. With zinc contents below 0.10 ZnO there is a rapid change toward the characteristic ultraviolet emission of strontium orthophosphate as the zinc content decreases. With zinc contents above 0.35 ZnO there is a rapid loss of fluorescent efficiency with increasing zinc content until there is a complete loss of red fluorescence with ZnO content of 0.45 ZnO.

With excitation by 254 millimicron radiation we find the fluorescence changes only slowly with tin content and tin amounts between 0.01 and 0.08 moles of SnO per mole $\text{P}_2\text{O}_5$ have substantially the same readings in the green and blue though the red increases appreciably. In fluorescent lamps the brightness is nearly constant. With lower tin than 0.01 moles the brightness falls off slowly as it does with tin contents above 0.08.

With excitation by radiation from H.P.M.V. lamps there is a steady increase in brightness up to a tin content of about 0.09 moles, while above this the brightness falls off rather quickly.

The optimum firing temperatures are somewhat dependent on zinc content. Although temperatures as low as 1600° F. have given useful phosphors, we prefer to prefire at the highest practical temperature short of that giving severe sintering of the cake. This temperature is usually between 1850 and 2050° F., although temperatures as high as 2100° F. can be used. This method gives the phosphors with highest light emission.

We also prefer to reduce at a high temperature, and generally chose a temperature about 50° F. below that used for prefiring.

While increasing tin content improves the response to radiation from the H.P.M.V. lamp it has an adverse effect on temperature sensitivity. This temperature sensitivity is the decrease in fluorescence as the phosphor temperature increases. With tin contents between 0.005 and 0.08 we find there is a rise in efficiency as the temperature goes from room temperature up to about 200° C. This rise, which amounts to about 25% is independent of the tin content. Beyond 200° C. there is a drop in efficiency which depends on tin concentration. A rough indication of temperature sensitivity is the temperature at which the fluorescence is 50% of the maximum value. For phosphors containing 2.65 moles of SrO, 0.20 moles of ZnO for each mole of $\text{P}_2\text{O}_5$, we found

| Moles of tin: | Temp. for 50% fluorescence ° C. |
|---|---|
| 0.005 | 470 |
| 0.010 | 430 |
| 0.020 | 380 |
| 0.040 | 350 |
| 0.080 | 310 |

Other objects, advantages and features of the invention will be apparent from the following description in which the figure shows a lamp according to one embodiment of the invention.

In the figure, the lamp shown comprises a fluorescent coating 1 on the outer jacket or envelope 2 of light-transmitting material within which an arc tube 4 is supported. The arc tube 4 is provided with main electrodes 6 and 8 at the ends thereof and an auxiliary electrode 10 disposed adjacent to the main electrode 8. The tube 4 is also provided with a filling of mercury and an inert gas The stem press 12 of the outer envelope 2 is provided with a pair of lead-wires 14 and 16, through which the arc tube 4 may be connected to a source of electrical energy. Lead-wire 14 is connected to electrode 8 of the arc tube 4 by a metal ribbon 18. A substantially U-shaped support wire 20 is mounted on lead-wire 16. Collars 22 and 24, which encircle the arc tube 4 adjacent to the constricted ends thereof, are fixedly attached to the legs of the U-shaped wire 20 and thus support the arc tube within the outer envelope 2. A plate 26 bridges the free ends of the U-shaped support wire 20 and is fixedly attached thereto to impart rigidity to the structure. The free ends of the U-shaped support wire 20 are also provided with a pair of resilient metal fingers 28 which are fixedly attached thereto, the ends of the fingers 28 frictionally engaging the inner wall of the constricted upper end of the envelope 2 to further support the structure. Similarly, the lower portion of the legs of the U-shaped support wire 20 is provided with resilient metal fingers 30 and 32 which are fixedly attached thereto, the ends of the fingers 30 and 32 frictionally engaging the inner wall of the constricted lower end of the envelope 2.

Inside said lower end, a resistor 34 is disposed on wire 20 and is seated on an insulator button 35 which, in turn, rests on the upper longitudinal edge of resilient metal finger 32. Lead-wire 36 of resistor 34 is wound around support wire 20 and it is also welded thereto. This mode of connection has been found to be particularly advantageous because, even if a weld failure should occur, the tight winding of lead-wire 36 about support wire 20 has been found to be adequate enough to maintain the electrical circuit through these members. Lead-wire 38 of resistor 34 is welded to metal ribbon 40 which is in turn connected to auxiliary electrode 10 of the arc tube 4.

Although considerable rigidity is imparted to the structure by positioning the resistor 34 on support wire 20 and winding lead-wire 36 of resistor 34 about support wire 20 and welding it thereto, additional structural rigidity may be obtained by positioning the resistor 34 on the support wire 20 so that the lower end thereof is seated on insulator button 35 and the upper end thereof is engaged by a depending flange 42 of collar 24. Another advantage which accrues from the use of insulator button 35 is the elimination of arcing, since the button 35 prevents contact between the body of resistor 34 and support wire 20; this displacement prevents electrolysis of and ultimate arcing through of the resistor core.

The fluorescent coating 1 on the inside surface of bulb 2 can be deposited by various methods known in the art, but we have found that a gain of several lumens per watt in lamp efficiency is obtained by the use of electrostatic coating method described in copending application Serial No. 563,540 filed February 20, 1956, by Albert H. Nimblett, Jr., for "Metering Apparatus for Material Divided Into Small Particles," and assigned to the same assignee as the present application.

A general description of the phosphor used has been already given, but a more detailed description is given below, in which various embodiments of our phosphors are described, and certain ones noted as being particularly effective in high pressure mercury lamps. Other embodiments are shown as useful in other types of fluorescent lamps. The examples are merely illustrative and the invention is not to be considered as limited to the examples described.

In these examples, the photometer readings are expressed in arbitrary units giving the relative linear response of a photomultiplier tube with filters between the phosphor and the multiplier tube to select the blue, green and red light emitted.

*Example I*

A mixture of the following ingredients was made and fired in porcelain crucibles in air for 1 hour at 2100° F.

| Ingredient: | Moles |
|---|---|
| $SrHPO_4$ | 2.00 |
| $SrCO_3$ | 0.65 |
| $ZnO$ | 0.20 |
| $SnO_2$ | 0.02 |

The foregoing non-fluorescent powder was then refired in a mixture of 2% hydrogen and 98% nitrogen for ½ hour at 2000° F. to give a phosphor with excellent fluorescence. The photometer readings with two types of excitation were:

| | Red | Green | Blue |
|---|---|---|---|
| Germicidal lamp | 138 | 49 | 29 |
| H.P.M.V. lamp | 35 | 58 | 82 |

The radiation from the germicidal lamp was chiefly of about 250 millimicrons wavelength. That from the H.P.M.V. lamp was largely 313 and 366 millimicrons. The radiation was that emanating from the inner discharge tube of an H.P.M.V. lamp, the discharge tube operating at high pressure but being without an outer jacket. The phosphor was on a plaque at about room temperature.

The composition of the finished phosphor in the above example was:

| Ingredients: | Moles |
|---|---|
| $SrO$ | 2.65 |
| $ZnO$ | 0.20 |
| $P_2O_5$ | 1.00 |
| $SnO$ | 0.02 |

*Example II*

Mixtures similar to Example I containing 0.20 moles of ZnO and 0.65 moles of $SrCO_3$ and 2.00 moles of $SrHPO_4$ were made up with varying amounts of SnO. These were prefired in air at 2000° F. and then reduced in 2% hydrogen at 2000° F. The photometer readings were:

| SnO | Germicidal | | | H.P.M.V. | | |
|---|---|---|---|---|---|---|
| | Red | Green | Blue | Red | Green | Blue |
| 0.002 | 91 | 37 | 20 | 12 | 16 | 50 |
| 0.005 | 114 | 42 | 22 | 21 | 27 | 66 |
| 0.010 | 121 | 45 | 26 | 38 | 45 | 75 |
| 0.040 | 138 | 49 | 34 | 78 | 78 | 97 |
| 0.080 | 147 | 50 | 25 | 110 | 109 | 106 |
| 0.120 | 91 | 32 | 14 | 38 | 42 | 53 |

Although the above examples are for the method with prefiring, mixtures of the same materials and proportions as in the above examples can be fired directly in the reducing atmosphere if desired, without prefiring in air. The mixture can include stannous oxide as the source of tin, and if fired directly in the reducing atmosphere, the tin will remain in the stannous state, and the results will be substantially the same as above.

*Example III*

Mixtures similar to Example I, containing 0.20 moles of ZnO, 2.00 moles of $SrHPO_4$ and 0.08 moles of $SnO_2$ were made with two different amounts of $SrCO_3$ to give different total amounts of SrO in the finished phosphor. These were prefired in air at 2000 and then reduced in 2% hydrogen at 1900° F. The photometer readings were:

| Total SrO | Germicidal | | | H.P.M.V. | | |
|---|---|---|---|---|---|---|
| | Red | Green | Blue | Red | Green | Blue |
| 2.75 | 108 | 45 | 47 | 90 | 89 | 86 |
| 2.70 | 117 | 44 | 40 | 100 | 99 | 96 |

*Example IV*

Mixtures similar to Example I were made with varying amounts of ZnO and SrO per mole of $P_2O_5$ as listed below. These were prefired for one hour in air and then reduced at the same temperature in 2% hydrogen. The photometer readings were:

| ZnO | SrO | SnO | Temp. | Germicidal | | | H.P.M.V. | | |
|---|---|---|---|---|---|---|---|---|---|
| | | | | Red | Green | Blue | Red | Green | Blue |
| 0.02 | 2.83 | 0.02 | 2,000 | 9 | 10 | 52 | 4 | 5 | 29 |
| 0.05 | 2.80 | 0.02 | 2,000 | 45 | 20 | 35 | 12 | 14 | 43 |
| 0.10 | 2.75 | 0.02 | 2,000 | 92 | 36 | 41 | 34 | 38 | 66 |
| 0.30 | 2.55 | 0.02 | 1,900 | 165 | 54 | 22 | 72 | 72 | 91 |
| 0.45 | 2.40 | 0.02 | 1,800 | 27 | 12 | 8 | 3 | 17 | 112 |

Our new phosphors are useful in fluorescent lamps giving a pinkish white color with a high amount of red light present in the spectrum. By combining these phosphors with a blue emitting phosphor a lamp giving white light can be obtained. As previously stated, they are also very useful for color correction of the light emitted by H.P.M.V. lamps giving orange and red components to the emitted light which are not present when phosphors are not used on the outer envelope.

Despite the greater percentage drop in light output with increasing temperature, the phosphors with high tin contents, from about 0.04 to about 0.10 mole per mole of equivalent phosphorous pentoxide, give greater output in a high pressure mercury lamp than do the lower tin contents. However, at tin contents above about 0.1 mole per mole of phosphorous pentoxide, the light output is considerably reduced.

It will be noted that although for convenience, the final phosphor composition is described in terms of certain oxides, that such oxides are not present separately in mere physical mixtures, but are combined into a composite crystal.

The raw materials from which the phosphor is made should be free of heavy metal impurities such as iron, nickel, cobalt, vanadium, chromium, copper and other materials which act as poisons for fluorescence. The raw materials should also be free of anion impurities such as nitrate and sulfate, since such impurities are found to have a detrimental effect on fluorescence, especially when the phosphor is excited by longer wave-length ultraviolet such as 313 millimicrons.

What we claim is:

1. A high pressure mercury lamp comprising a high pressure discharge tube, a light-transmissive outer jacket spaced therefrom and in which said tube is held, and a coating of strontium zinc phosphate phosphor on said jacket and having, for each mole of phosphorous pentoxide, about 0.08 moles of stannous oxides, about 2.65 moles of strontium oxide and about 0.2 moles zinc oxide.

2. A high pressure mercury lamp comprising a high pressure discharge tube, a light-transmissive outer jacket spaced therefrom and in which said tube is held, and a coating of a red-emissive strontium zinc orthophosphate phosphor on said jacket, said phosphor having, for each mole of phosphorous pentoxide, between about 2.75 and 2.90 moles of zinc oxide plus strontium oxide, the amount of zinc oxide being between about 0.1 to 0.3 moles, and between about 0.04 and 0.12 moles of stannous oxide, said phosphor being a reaction product fired at between about 1900° F. and 2100° F.

References Cited in the file of this patent

UNITED STATES PATENTS

| 2,176,151 | Ruttenauer | Oct. 17, 1939 |
| 2,723,958 | Shaffer et al. | Nov. 15, 1955 |
| 2,748,303 | Thorington | May 29, 1956 |